Jan. 2, 1951 A. F. TURNER 2,536,787
ECONOMY HOG FEEDER
Filed Jan. 15, 1948 3 Sheets-Sheet 1

INVENTOR.
Albert F. Turner,
BY Victor J. Evans & Co.
ATTORNEYS

Jan. 2, 1951 A. F. TURNER 2,536,787
ECONOMY HOG FEEDER
Filed Jan. 15, 1948 3 Sheets-Sheet 2
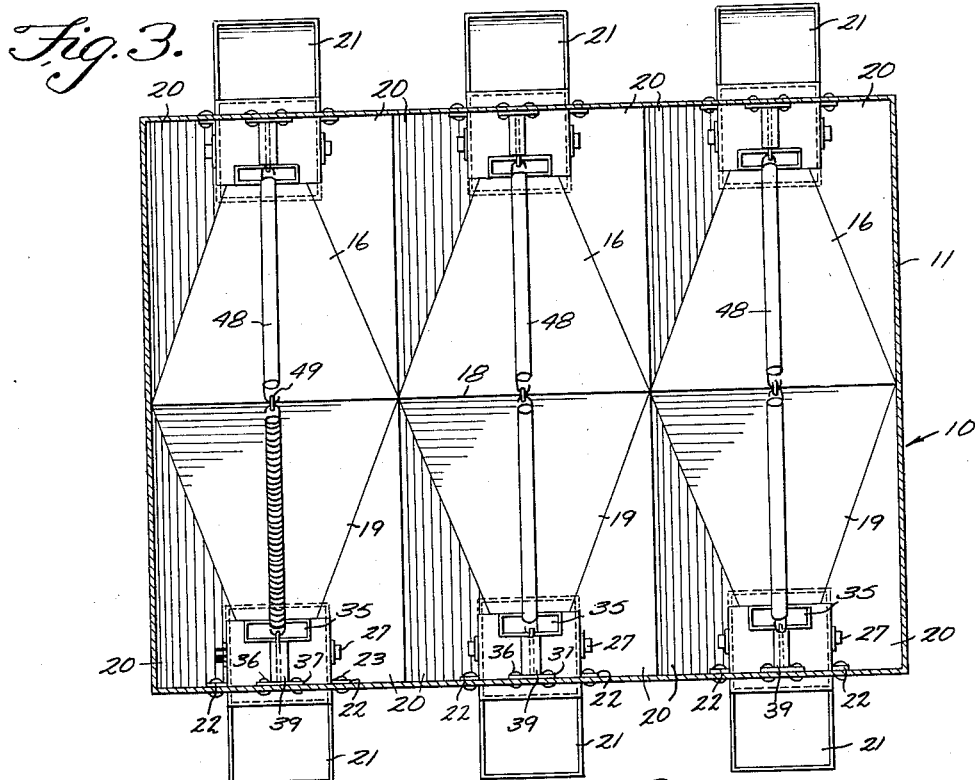
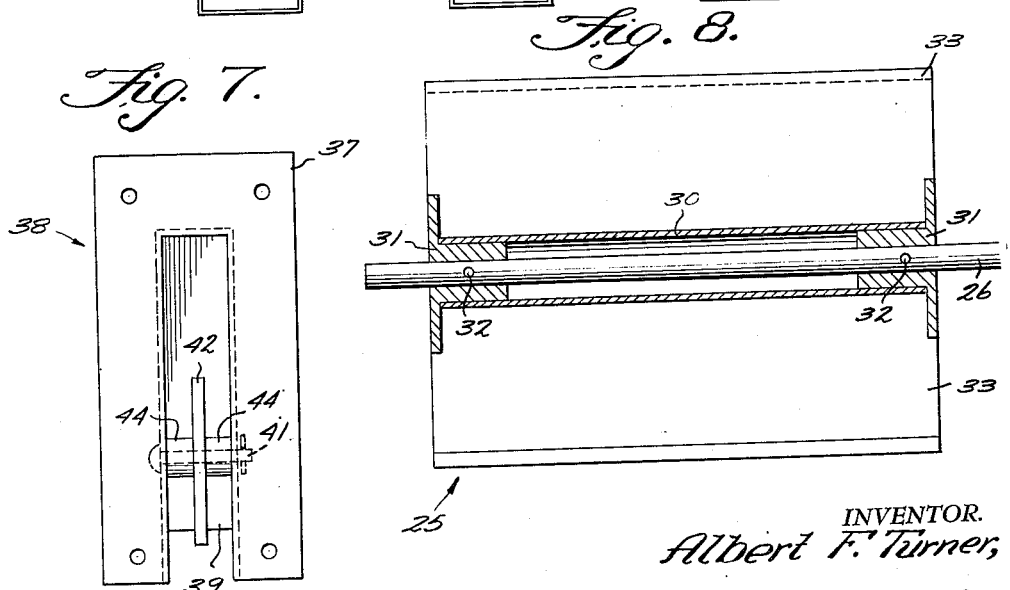
INVENTOR.
Albert F. Turner,
BY Victor J. Evans &Co.
ATTORNEYS Jan. 2, 1951 A. F. TURNER 2,536,787
ECONOMY HOG FEEDER
Filed Jan. 15, 1948 3 Sheets-Sheet 3

INVENTOR.
Albert F. Turner,
BY Victor J. Evans & Co.
ATTORNEYS

Patented Jan. 2, 1951

2,536,787

UNITED STATES PATENT OFFICE 2,536,787

ECONOMY HOG FEEDER

Albert F. Turner, Altoona, Pa.

Application January 15, 1948, Serial No. 2,371

1 Claim. (Cl. 119—54)

This invention relates to a hog feeder which is designed to use any kind of feed from the consistency of mash to the consistency of chop feed or clean shelled corn, and may be used for animals from weaning time until full maturity.

An object of the invention is to provide an economical, rat-proof, weather-proof feeder for dry feeding hogs, which is simple in construction, efficient in operation and durable in use.

With the above and other objects and advantages in view, the invention consists of the novel details of construction, arrangement and combination of parts more fully hereinafter described, claimed and illustrated in the accompanying drawings in which:

Figure 3 is a horizontal cross-sectional view of Figure 1;

Figure 7 is an elevational view of the spring agitator and the support therefor, and Figure 8 is a longitudinal, cross-sectional view of the feeding rotor.

Figure 1:
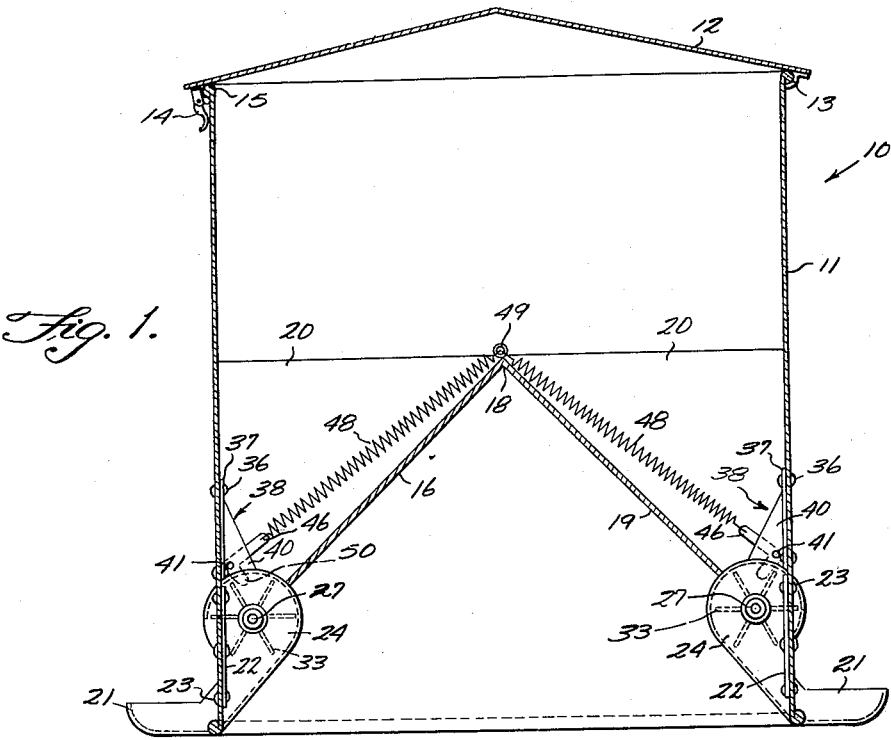
Figure 1 is a vertical, sectional view of an embodiment of the invention.
Figure 2:
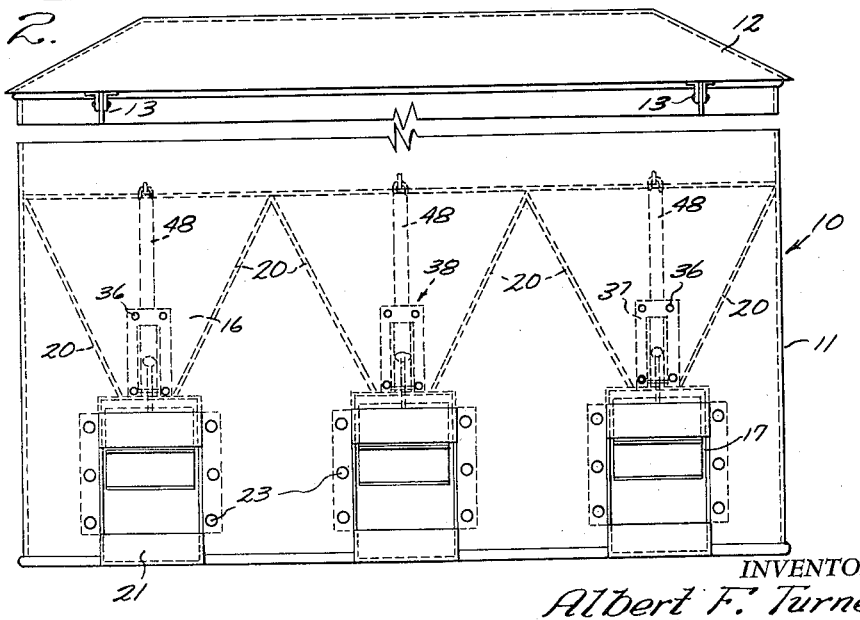
Figure 2 is an elevational view, partly broken away, with the interior details shown in dotted lines.

Referring more in detail to the drawings, the reference numeral 10 designates a hog feeder which is constructed in accordance with the teaching of the invention.

The feeder 10 will be seen to consist of a box-like hopper 11, which is provided with a peaked cover 12 hinged at 13 along its rear longitudinal edge to the rear top longitudinal edge of the hopper 11. Latches 14, fixed to the front longitudinal edge of the cover, engage the rolled edge 15 of the front top longitudinal edge of the hopper 11, to retain the cover in closed relation to the hopper 11.

The hopper 11 is provided with a plurality of baffle plates 16 which incline downwardly from the central, longitudinal line of the hopper 11 to a point adjacent the feeding openings 17 in one side of the hopper 11. Meeting with the upper edges of the baffle plate 16 to form a plurality of peaks 18, are the upper edges of the baffle plates 19. Thus the baffles form a plurality of triangles within the hopper 11.

The baffles are also somewhat triangular in shape, and along each outer edge, are joined with declining baffles 20 which form with the baffles 16 and 19, feeding triangles which diverge according to the inclination of the baffles toward the feeding openings 17.

Extending through each opening 17, is a feed tray 21 and each tray is provided with oppositely disposed flanges 22 whereby, through the medium of fasteners 23, the trays are fixed to the hopper 11.

The rear of the tray 21 forms the drum-like housing 24 which encloses the feeding rotor 25. The rotor 25 is mounted on the shaft 26 journalled at its ends in bearings 27 carried by the housing 24.

A curved plate 28 removably fixed at 29 to the rear of the housing 24 permits access to the rotor 25 for replacement or the cleaning thereof.

The rotor 25 comprises the tubular hub 30 which carries the bushings 31 fixed at 32 to the shaft 26 so that the rotor and shaft rotate as a unit.

Radially diverging fins 33 on the tubular hub 30 provide predetermined feeding sections 34 which transfer feed to the trays 21 as the rotor is rotated.

Each drum 24 is provided with a flange feed receiving opening 35 which communicates with the feeding troughs formed by the baffles 16 and 19. Thus as the rotor 25 is rotated, feed will pass through the openings 35 into the feeding sections 34.

Secured to the inner surface of the hopper 11, above the drum 24, by means of fasteners 36, is the face plate 37 of the trigger housing 38.

Figure 4:
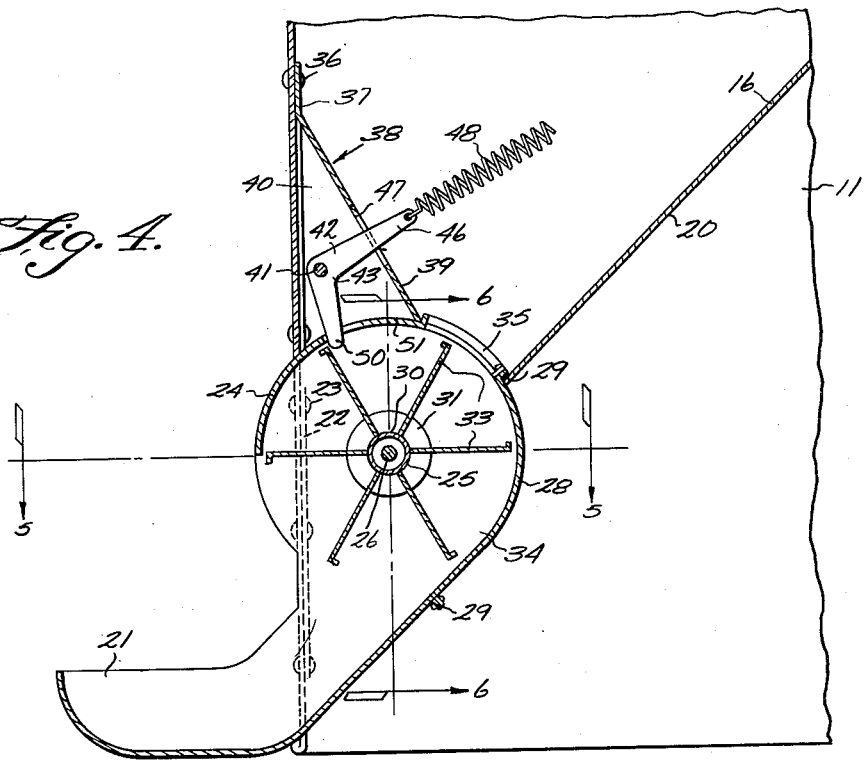
Figure 4 is an enlarged, detailed, fragmentary, sectional view of one of the feeding rotors.
Figure 5:
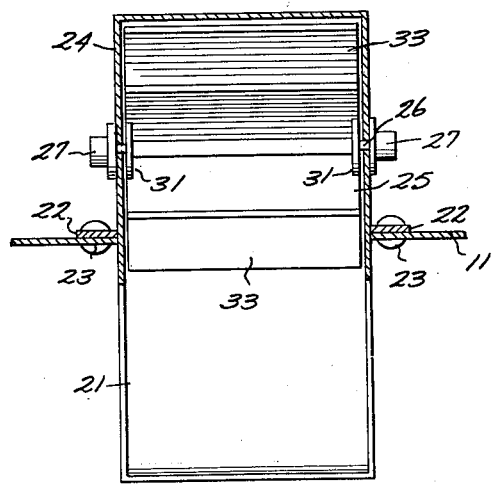
Figure 5 is a horizontal, cross-sectional view on the line 5—5 of Figure 4.
Figure 6:
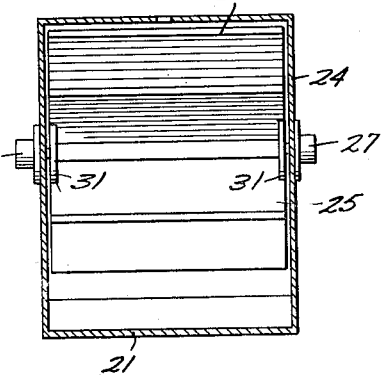
Figure 6 is a vertical, sectional view on the line 6—6 of Figure 4.

The back 39 of the housing 38 is stamped from the plate 37, and is bent rearwardly, as shown in Figure 4, sides 40 are then flex to the edges of the back 39 and to the rear surface of the plate 37.

The lower edges of the sides are curved to conform to the shape of the drum housings 24, and the lower edge of the back 39 engages the drum housings 24 at the flange openings 35 of the housings 24. Thus the feed cannot enter the housing 38.

The sides 40 of the housing 38 carry the pin shaft 41 on which the angled trigger 42 is pivoted at its angle 43. Bushings 44, sleeved on the shaft 41, engage the trigger to center the trigger with respect to the housing 38.

The end 46 of the trigger 42 extends through a slot 47 in the center of the back 39 to receive one end of a coil spring 48. The spring 48, at its upper end, is fixed to a screw eye 49 fixed at the peak 18 of the baffles 16 and 19. From a view of Figure 3, it will be seen that each tray has a drum housing and rotor and a trigger tensioned by a spring 48.

The other end 50 of the trigger 40 extends through an opening 51 in the drum housing 24 to permit engagement of the end of the trigger with the blades 33 of the rotor.

Should small particles of the feed enter the slot 47, in the back 39, they will pass through the housing 38 outwardly of the opening 51 in the drum housing 24 into the feeding sections of the rotor, to be fed into the trays 21.

In use, a bag of feed is deposited in the hopper after the cover has been opened for this purpose. The feed falling on the springs 48 tensions the springs which, in turn, tension the trigger 42.

The feed will slide down the baffles into the feeding section of the rotor in alinement with the openings 35 in the drum housings 24. The hog, smelling the feed with his nose, rotates the blades 33 of the rotor 25. The rotor will be turned clockwise against the end 50 of the trigger 42. The blade 33 of the rotor will engage the end of the trigger pivoting the trigger and pulling on the spring. The action of the trigger will cause the spring to expand and agitate the feed to cause the feed to enter the openings 35.

The front edge of the housing 24 prevents the hog from further turning the rotor so that only the feed from one feeding section is deposited in the tray at a time. After this feed has been eaten, the rotor can be again turned to deposit feed into the tray.

The end of the trigger 50 will also engage the blades 33, should the rotor be turned anti-clockwise, and stop the rotation of the rotor. Thus rats cannot climb up the rotor, and enter the feed hopper or get the feed from the rotor.

The spring 48 will return the trigger to the position shown in Figure 4 after each one-sixth of a rotation of the rotor 25.

There has thus been provided a feeder which will accomplish the objects of the invention, and it is believed that from the foregoing description, the operation and structure of the feeder will be apparent to those skilled in the art.

It is also to be understood that changes in the minor details of construction, arrangement and combination of parts can be resorted to, provided they fall within the spirit of the invention and the scope of the appended claim.

Having thus described the invention, what is claimed as new and desired to be secured by Letters Patent is:

In an animal feeder of the type described, having a body, a plurality of feeding troughs formed in said body, feeding trays communicating with said troughs, and drum housings on said trays, the improvement comprising rotor feeders in said housings which are operated by the animals in the act of eating to transfer feed from the troughs to said trays, and spring means actuated by said feeders to cause the feed to be agitated and transferred to said trays, a pivoted trigger mounted for engagement with said feeders and connected to said spring means so that movement of said feeders will cause said trigger to actuate said spring means and said trigger will prevent reverse rotation of said feeders.

ALBERT F. TURNER.

REFERENCES CITED

The following references are of record in the file of this patent:

UNITED STATES PATENTS

| Number | Name | Date |
|---|---|---|
| 85,379 | Going | Dec. 29, 1868 |
| 1,179,351 | Dierks | Apr. 11, 1916 |
| 1,199,328 | Wyckeart | Sept. 26, 1916 |
| 1,326,273 | Knutson | Dec. 30, 1919 |
| 1,554,145 | Vugrinec | Sept. 15, 1925 |
| 1,783,092 | Lewis | Nov. 25, 1930 |
| 1,885,979 | Bobrick | Nov. 1, 1932 |
| 1,996,044 | Green | Mar. 26, 1935 |

FOREIGN PATENTS

| Number | Country | Date |
|---|---|---|
| 215,942 | Great Britain | May 22, 1924 |
| 143,093 | Austria | Oct. 10, 1935 |